J. E. SELTZER.
HOT AIR HEATING SYSTEM.
APPLICATION FILED JUNE 7, 1911.
1,134,703.
Patented Apr. 6, 1915.
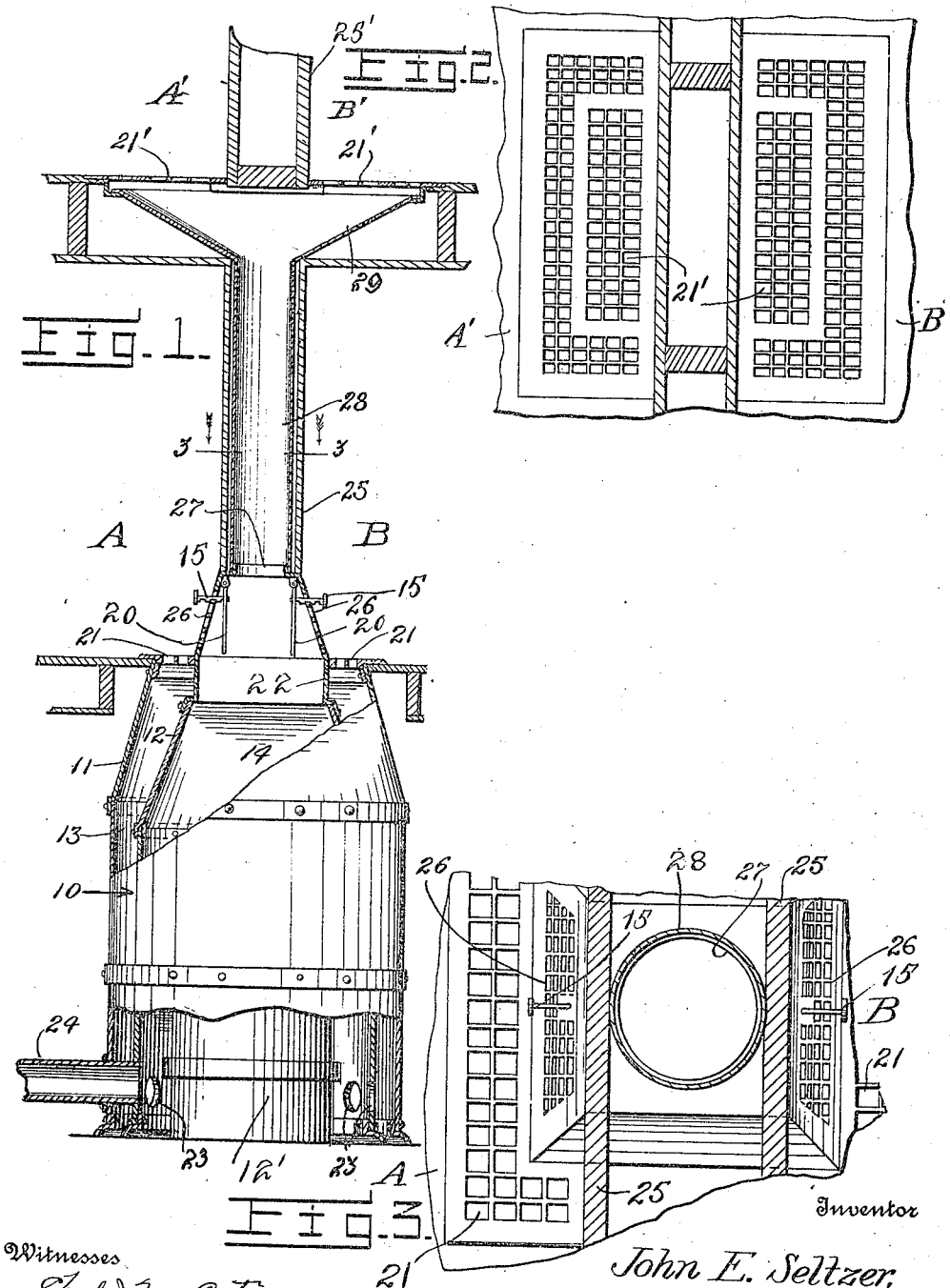
Witnesses
Charles J. MacCarter
Harry M. Test
Inventor
John E. Seltzer,
By Harry Ellis Chandlee
Attorney

UNITED STATES PATENT OFFICE.

JOHN E. SELTZER, OF FLINT, MICHIGAN.

HOT-AIR HEATING SYSTEM.

1,134,703.  Specification of Letters Patent.  Patented Apr. 6, 1915.

Application filed June 7, 1911. Serial No. 631,731.

*To all whom it may concern:*

Be it known that I, JOHN E. SELTZER, a citizen of the United States, residing at Flint, in the county of Genesee and State of Michigan, have invented certain new and useful Improvements in Hot-Air Heating Systems, of which the following is a specification.

This invention relates to improvements in hot-air heating systems and has for its principal object to provide a cheap system of this character which will obviate the necessity for the usual amount of piping.

Another object is to provide a hot air heating system which will effectively heat a plurality of rooms on each of several stories of a house with the use of a minimum amount of hot air conducting pipes.

These and other objects will be apparent from the following description and with particular reference to the accompanying drawings, it being understood that changes in the specific structure shown and described may be made within the scope of the claims without departing from the spirit of the invention.

In the drawings: Figure 1 is a vertical section through two floors in a dwelling showing the method of heating two stories, the furnace being partly broken away, Fig. 2 is a plan view of the floor of the second story showing the gratings, the wall being in section, Fig. 3 is an enlarged section on the line 3—3 of Fig. 1.

Referring particularly to the accompanying drawings, and especially to Fig. 1 there is shown a furnace structure represented as a whole by the reference character 10. This furnace structure includes the outer inclosing wall 11, the inner concentrically arranged wall 12 which provides an intermediate cold air return chamber 13 and the inner hot air chamber 14, and the fire box 12' disposed at the bottom of the space within the wall 12. Mounted on the top of the wall 12, and extending into the wall 25 between the rooms A and B of the first floor, is a drum 22, the upper portion of which has the inclined latticed sides 26 disposed in the rooms A and B, the lower end of the drum being open and communicating directly with the hot air chamber 14. Mounted on the floor in each of the rooms A and B, and at the lower ends of the latticed portions 26 are the gratings 21, these gratings being disposed over the space between the upper ends of the walls 11 and 12 and arranged to permit the cold air on the floors of the rooms to pass down the space 13. Formed transversely through the lower portion of the wall 12 are openings 23, these openings permitting the cold air which passes from the rooms A and B to enter into the space around the fire pot to be reheated and passed up through the hot air chamber 14 to the drum 22. A pivoted depending door 20 is disposed inwardly of each of the latticed sides 26, and each of these doors carries a notched operating stem 15 which extends through the latticed wall for adjusting the said door into open or closed position. By closing either of these doors, heat will be prevented from passing out of the grating to the adjacent room. The upper end of the drum 22 is formed with a nipple 27 to which is connected the lower end of a hot air conducting pipe 28 which extends vertically through the wall 25, and terminates below the floor of the rooms A' and B' of the second floor. Seated in the floors of these rooms A' and B' are the gratings 21', and disposed under these gratings and connected to the upper end of the pipe 28 is a funnel-shaped member 29 which is arranged to discharge hot air through both of the gratings 21'. These gratings 21' are disposed close to the dividing wall 25' as shown. Extending through the wall 11 is a fresh air conducting pipe 24, the outer end of which communicates with the air outside of the building while the inner end is secured within one of the openings 23 to conduct fresh air into the space around the fire pot, this air being then heated and passing up through the hot air chamber 14 into rooms A and B and A' and B'.

From the foregoing it will readily be seen that I have provided a simple, cheap and effective hot air heating system wherein a room or rooms may be easily heated without the necessity of the extensive piping systems in common use with the hot-air furnaces, and in which gratings conduct the heated air into the room or rooms, and conduct the cold air therefrom.

What is claimed is:

1. A hot air heating system including a furnace, an inner casing spaced therefrom and forming therewith a hot air chamber, an outer casing forming with the inner casing a cold air chamber, a vertically extending hot air drum mounted on the top of the inner casing and having apertured sides, a hot air flue extending from the drum to the floors of rooms of the upper story, a funnel mounted on the upper end of the flue, gratings mounted in the floors of rooms above the cold air chamber, the said hot air drum projecting between said gratings, and gratings mounted in the floors of the upper story rooms over the funnel.

2. In a hot air heating system, a furnace, an inner casing spaced from the furnace and forming therewith a hot air chamber, said casing extending to a point below the floors of adjacent rooms above the furnace, an outer casing forming with the inner casing a cold air chamber, said outer casing extending to the said floors, a vertical hot air drum mounted on the top of the inner casing and over the hot air chamber, said drum being provided with apertured sides, and disposed within the division wall of the rooms above the furnace, gratings mounted in the floors adjacent to the said drum, and over the cold air chamber, swinging damper plates in the said drum for the said apertured sides, a hot air flue extending from the drum to the floors of rooms to the upper story, a funnel mounted on the upper end of the flue, and gratings mounted in the floors of the upper story rooms over the funnel.

In testimony whereof I affix my signature, in the presence of two witnesses.

JOHN E. SELTZER.

Witnesses:
MAUD HOVEY,
MILDRED E. WILCOX.